(12) United States Patent
Briles

(10) Patent No.: US 7,311,575 B1
(45) Date of Patent: Dec. 25, 2007

(54) BUOY AND BUOY MOUNTING BRACKET

(76) Inventor: Roger Daniel Briles, 6500 Reidsville Rd., Belews Creek, NC (US) 27009

( * ) Notice: Subject to any disclaimer, the term of this patent is extended or adjusted under 35 U.S.C. 154(b) by 341 days.

(21) Appl. No.: 11/072,092

(22) Filed: Mar. 4, 2005

Related U.S. Application Data

(60) Provisional application No. 60/550,540, filed on Mar. 5, 2004.

(51) Int. Cl.
*B63B 22/16* (2006.01)

(52) U.S. Cl. .............................. 441/13; 441/6; 441/23

(58) Field of Classification Search ............... 441/1–34
See application file for complete search history.

(56) References Cited

U.S. PATENT DOCUMENTS

| | | | |
|---|---|---|---|
| 1,993,974 A | 3/1935 | McVicker | |
| 2,977,608 A | 4/1961 | Brown, Sr. et al. | |
| 4,285,477 A | 8/1981 | Oxendahl et al. | |
| 4,501,563 A | 2/1985 | Johnson et al. | |
| 4,544,364 A * | 10/1985 | Bankston | 441/6 |
| 4,601,126 A * | 7/1986 | Klocksiem | 43/17.5 |
| 5,195,688 A | 3/1993 | Clemmons | |
| 5,449,308 A * | 9/1995 | Thompson | 441/6 |
| 5,613,888 A | 3/1997 | Lamphere | |
| D456,336 S | 4/2002 | Briles | |

* cited by examiner

*Primary Examiner*—Ed Swinehart
(74) *Attorney, Agent, or Firm*—Robert W. Pitts

(57) ABSTRACT

A stackable buoy can be mounted on a U-shaped mounting bracket that can in turn be attached to a panel, such as the inner surface of a boat hull. The buoy includes protrusions molded as part of parallel channels, which receive the two legs of the bracket. Multiple buoys can be stacked one of top of the other. Pockets on each side of the H-shaped buoy are provided for mounting commercially available light sticks.

17 Claims, 4 Drawing Sheets

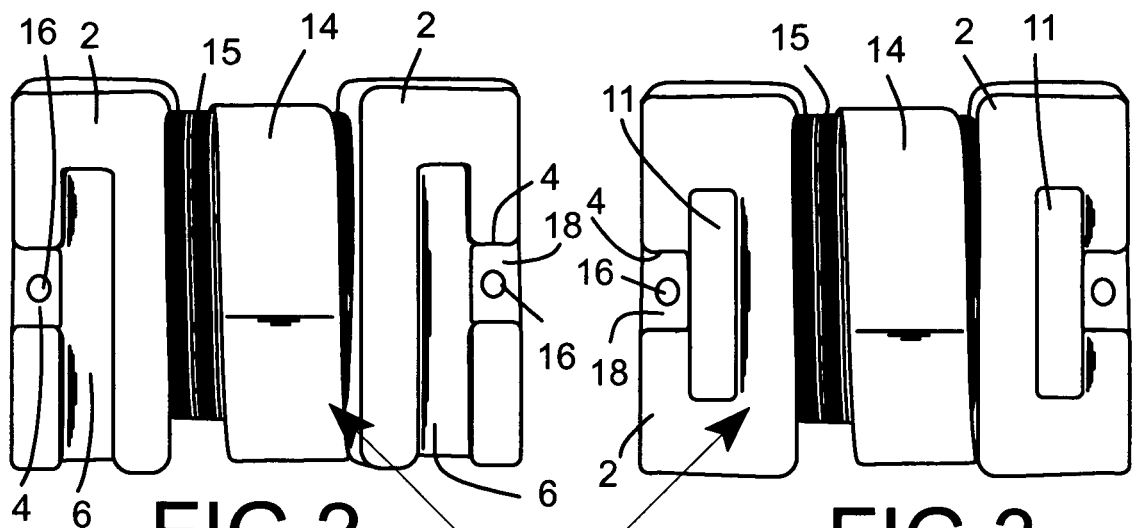
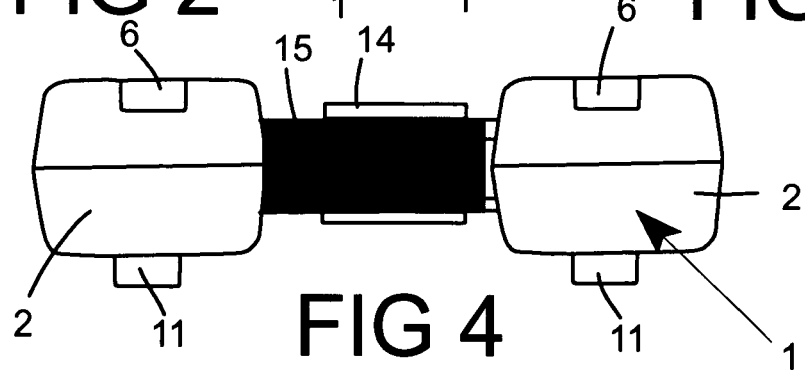
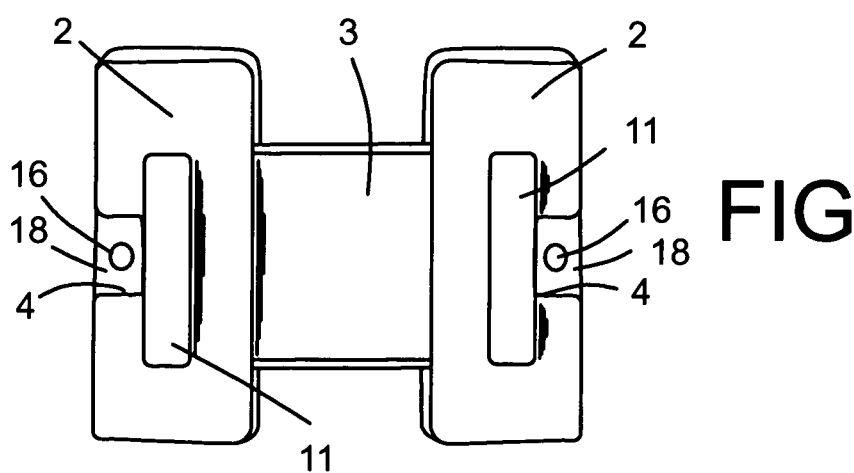

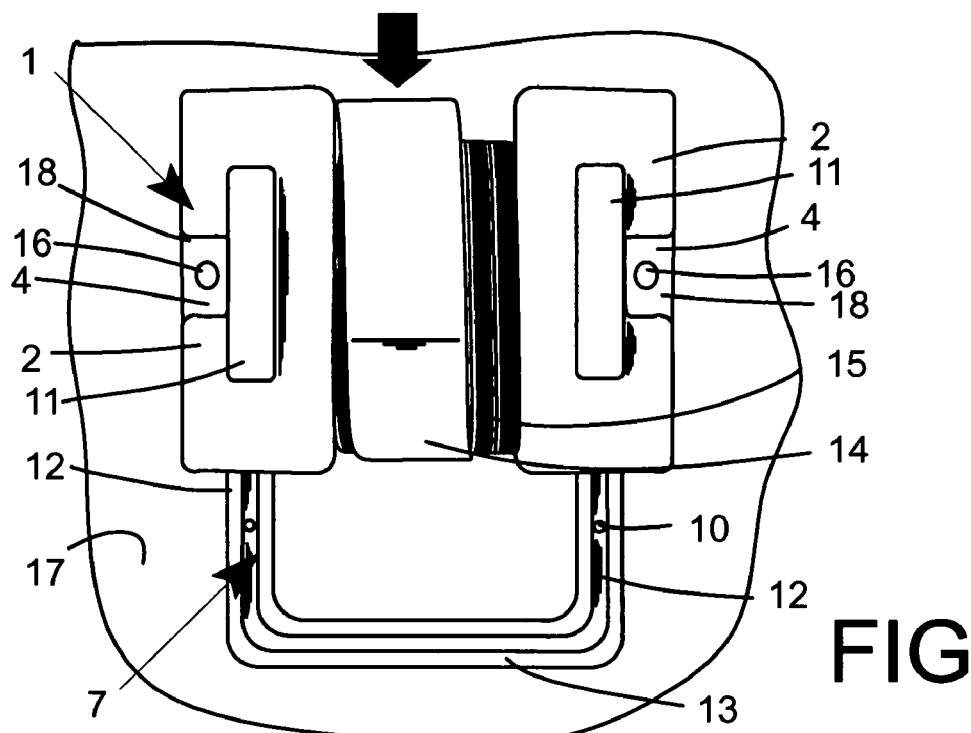
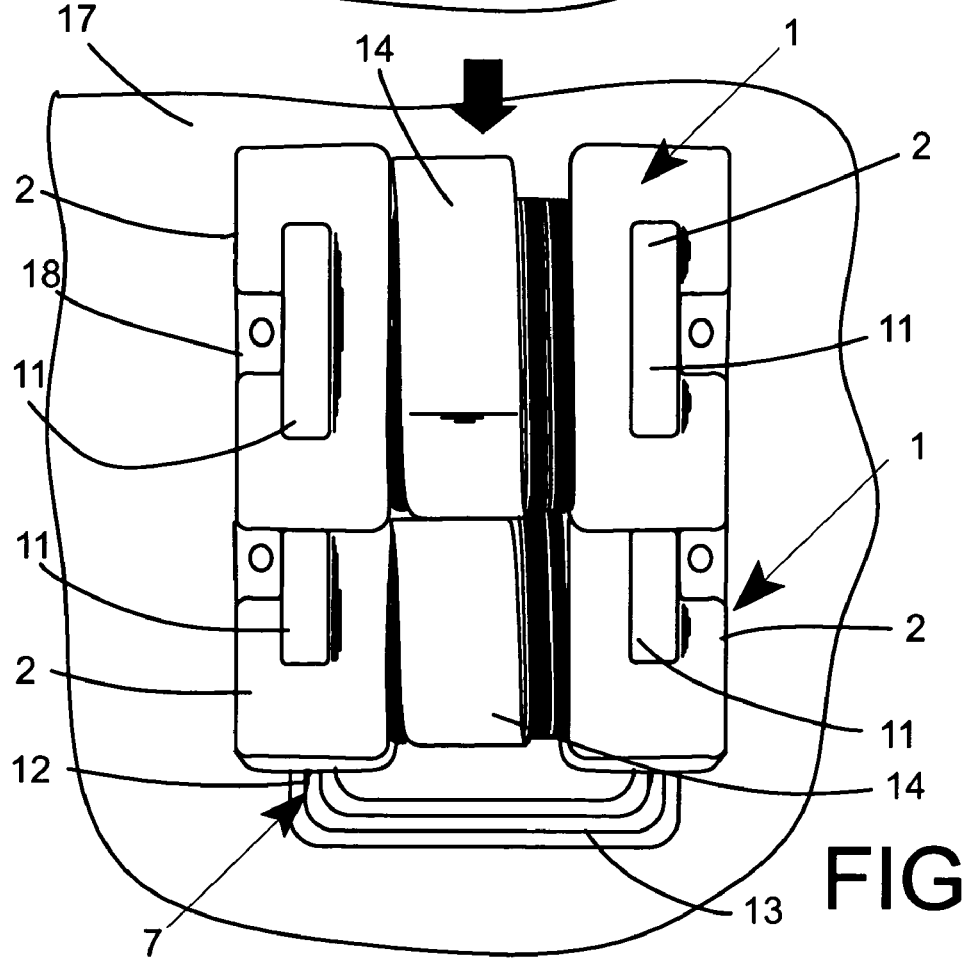

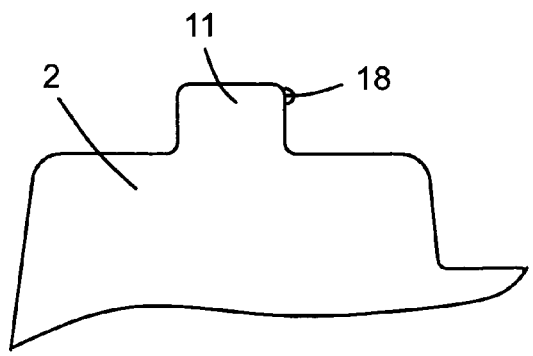
FIG 8
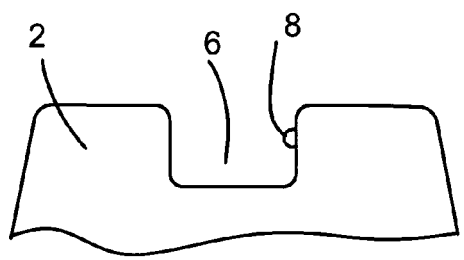
FIG 9
FIG 10
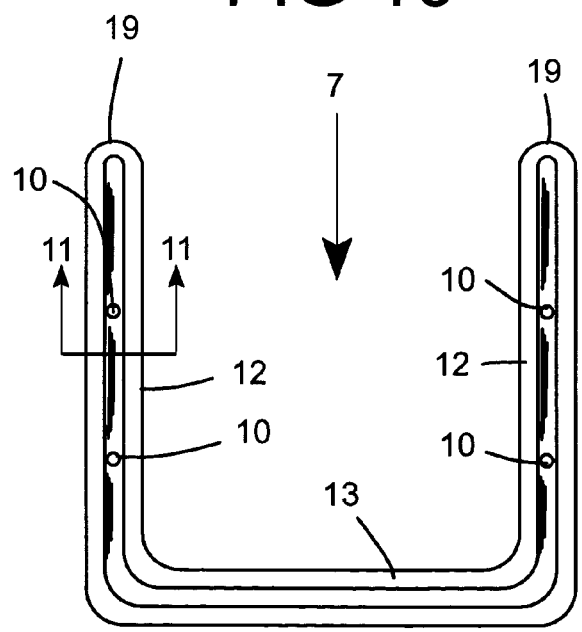
FIG 11
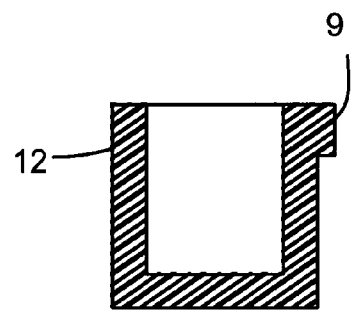

BUOY AND BUOY MOUNTING BRACKET

CROSS REFERENCE TO PRIOR CO-PENDING APPLICATION

This application claims benefit of prior co-pending U.S. Provisional Patent Application Ser. No. 60/550,540 filed Mar. 5, 2004.

BACKGROUND OF THE INVENTION

This invention relates to a marker buoy, which is useful to indicate the location of an underwater structure. Many fishermen fish at night and have need of marking their spot at night or in low light conditions. This invention also provides a pocket for securing a light stick which when activated, will emit light for an extended period of time. This invention also relates to a method of securing the buoy in a boat in a specified spot so that it might be readily available when needed.

DESCRIPTION OF THE PRIOR ART

Many fishermen use electronic devices for locating underwater structure and when they locate such structure, they have need to quickly locate their marker buoy and drop it at the desired location. This invention relates to marker buoys used primarily by fishermen, but could also be used in underwater rescue and the like.

For many years, fishermen have used various configurations of marker buoys. There are currently several marker buoys on the market. Most commercially available buoys use a weight attached to twine to anchor the buoy in position. The other end of the twine is wrapped around a central portion of the buoy. One example of such a marker buoy is made by Lindy Little Joe and is shaped somewhat like a dog bone. Other models are shaped more like an "H", as shown in Johnson U.S. Pat. No. 4,501,563. The "H" shape seems more common and may very well work better and be more stable.

OBJECTS OF THE INVENTION

It is therefore one object of this invention to provide an improved marker buoy. It is another object of this invention to provide a pocket for securing a light stick to enable the user to see their buoy at night. It is another object to provide a marker buoy with an apparatus for keeping said buoy in a predetermined spot for storage and readily available when needed. It is another object of this invention to provide a squared off "U" shaped bracket that will accept the underside of said buoy in a secure fashion for storage in a predetermined spot.

SUMMARY OF THE INVENTION

A buoy according to this invention can have a buoyant housing including a first inner or central section with a line wrapped around the central section for storage. The housing will also include at least one side section having a height greater than the first section, and the preferred embodiment will have two side sections forming an H-shaped configuration. The buoy will also include an elongate mounting section on one surface of the buoyant housing, preferably in the form of a channel. This surface extends beyond the line wrapped on the first section so that the elongate mounting section or channel will be exposed. The mounting section or channel can then be mated with a separate bracket member for mounting the buoy on the bracket when the buoy is not in use. An opposite protrusion can be received with a channel in the preferred embodiment so that multiple buoys can be stacked.

According to another aspect of this invention, the buoy will include a weight attached to a line and a housing. The housing will have a buoyant section and a smaller shaft section, extending from a first side of the buoyant section, about which a line is wrapped. A pocket will be formed adjacent a second side of the buoyant section. A mounting means, preferably a hole, will be located in the pocket for mounting a cylindrical light stick on the buoy either before or after the weight and line have been deployed to position the buoy in water.

A buoy of this general type can be part of a buoy bracket assembly for use on a boat. The bracket can be mounted on a bulkhead on the boat. This bracket includes at least one, and preferably two parallel arms. The buoy can be mounted on the bracket. This buoy has a buoyant housing having a channel extending along one face of the buoyant housing. The channel is configured for insertion of the bracket arm into the channel to mount the buoy on the bracket for storage of the buoy when not in use. The buoy will slide relative to the bracket arm for removal of the buoy from the bracket.

BRIEF DESCRIPTION OF THE DRAWINGS

FIG. 2 is a plan view of the buoy of FIG. 1 showing channel for mounting the buoy on a bracket or on another buoy.

FIG. 3 is plan view showing the surface opposite from that shown in FIG. 2 and also showing ridges that will fit within the channels shown in FIG. 2, when two buoys are stacked together.

FIG. 4 is an end view of the buoy shown in FIGS. 2 and 3, showing the channels and ridges on opposite faces.

FIG. 5 is a view showing the one-piece blow molded buoy housing with a central portion joining two mirror image side sections.

FIG. 6 is a view showing the manner in which a buoy can be mounted on a bracket attached to a bulkhead or wall.

FIG. 7 is a view showing a second buoy being stacked on top of a first buoy already mounted on a bracket.

FIG. 8 is a partial end view of one of the ridges on a buoy showing a rib located adjacent a top edge of the ridge.

FIG. 9 is a partial end view of one channel on a buoy showing a rib located along one side where it will overlap with a rib on the ridge of another buoy when the two buoys are in a stacked configuration.

FIG. 10 is a plan view of a bracket, which can be mounted on a bulkhead or wall so that one or more buoys can be mounted on the bracket.

FIG. 11 is a section view taken along section lines 11-11 in FIG. 10 showing an elongated protrusion extending inwardly from one bracket arm, where it will overlap with a rib in a channel of buoy mounted on the bracket.

DETAILED DESCRIPTION OF THE PREFERRED EMBODIMENT

Figure 1:
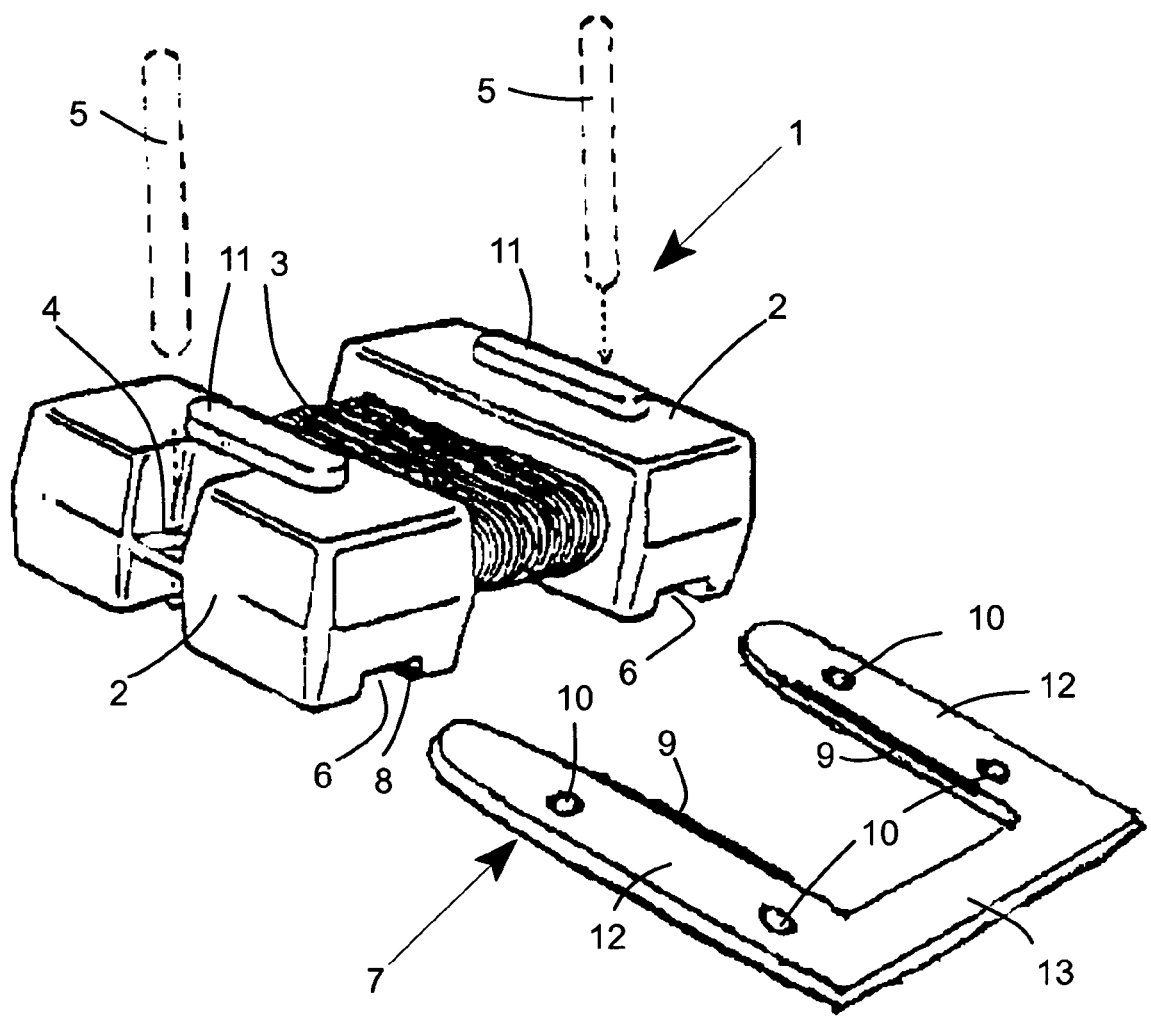
FIG. 1 is an exploded, three dimensional view of a buoy and mounting bracket in accordance with the preferred embodiment of this invention.

In accordance with one form of this invention, there is provided a marker buoy 1 that is formed hollow from plastic in the form of a modified "H". Marker buoy 1 has a first and second side members 2 connected by a central portion 3 located between the side members or sections. A line or twine 14 can be wrapped around the central shaft portion 3, as shown in FIG. 1. Each of the side members 2 includes a pocket 4 formed in the center of the outermost sides of side member or section 2. Pockets 4 include a hollow ring or hole 16 to accept a light stick 5, which can be inserted into the ring causing a snug fit so that the light stick 5 will not fall out when the buoy is rotated. Light stick 5 can be a commercially available light stick in which chemicals can be activated by bending a tube in which the chemicals are stored. The reaction between the two chemicals will produce light and the light stick will glow. The glow time of such light sticks can be up to 48 hours. A commercially available light stick having a diameter of 7.5 mm. and a length of 75 mm is marketed by American Cyanamide Co. using the trademark Cyalume. Two such light sticks 5 can be mounted on the buoy 1 comprising the preferred embodiment of this invention.

Each of the side members 2 has a channel 6 on the underside to accept the elongated members of the bracket 7. The channels 6 in the underside of the buoy 1 have an elongated protrusion 8 along the lower portion of the inside part of each channel 6. The bracket 7 also has an elongated protrusion 9 on the upper part of the both inside pieces of the bracket. Four mounting holes 10 are located in the bracket 7 for optional mounting to a panel, such as the vertical interior wall or bulkhead 17 of a boat hull. Preferably the bracket 7 is mounted using four small pieces of double faced adhesive and mounting bracket to a mostly vertical wall inside of the boat. When the channels 6 in the lower portion of the buoy 1 are engaged with the elongated sides of the bracket 7 and pressed down to a predetermined spot the buoy 2 will easily stay firmly in place. For removal, you simply slide buoy off the bracket in the opposite direction.

Ridges 1 are formed on the top of each of the two buoy side members 2. These protruding ridges 11 are dimensioned so that they can be received within channels 6 on a separate buoy so that the two buoys can be stacked one on top of the other. Indeed more than two buoys can be stacked in this manner and if the innermost buoy is mounted on the bracket 7, the entire stacked can be mounted on the boat hull where they are all readily accessible.

The body of buoy 1 is hollow and the buoy is substantially liquid tight so that the buoy is buoyant. FIG. 4 shows one version of the hollow buoy 1 in which the central portion 3 can comprise a single strut or oblong shaft having a depth somewhat smaller than the depth of the side members 2. Alternatively, the central portion of the hollow buoy can comprise multiple separate struts or tubes extending between the two side members. In either case, the buoy comprises a one-piece or integral member. Preferably the buoy is blow molded to form a one-piece buoy housing as shown in FIG. 5, but the buoy can be fabricated using other processes. For instance, top and bottom shells can be injected molded and the two shells can be attached or fused to each other to form the one-piece buoyant buoy body.

The two side sections 2 are substantially identical and are mirror images on opposite sides of the central section 3, as shown in FIGS. 1-4. When fabricated by a blow molding technique, these side sections 2 of the one-piece buoy housing are each hollow and provide most of the buoyancy for the buoy 1. The channels 6 extending into the top surface of the side sections 2, as shown in FIG. 4 are parallel and extend generally perpendicular to a centerline extending through the central section, shaft or strut 3. Ridges 11, extending outwardly from the bottom surface of side portions 2, as shown in FIG. 3, are also parallel to the channels 11 extending from the opposite surface, and the ridges are each aligned with the corresponding channels 6. The cross sectional area of the ridges 11 are only slightly smaller than the cross sectional area of the channels 6, so the ridges 11 will fit within opposed channel 6 on a buoy stacked on top of a first buoy. As shown in the plan view of FIG. 2, the channels 6 are open on one end, but do not extend through the entire height of the buoy 1. Similarly the length of the ridges 11, as shown in FIG. 3, is less than then parallel dimension of each side section, so that each ridge 11 forms a generally rectangular solid protrusion extending from the corresponding buoy section 2. The closed end of each channel 6 will form a stop surface when either an arm 12 of the U-shaped bracket 7 is inserted into a channel 6, or a ridge 11 on a stacked buoy is inserted into an aligned channel 6. The ribs 8 in the channels 6 protrude from the innermost wall of each channel, and these ribs 8 will overlap the elongated protrusion 9 on a bracket arm 12 inserted into the channel 6. The height of these ribs is approximately 1 mm. In actual use the buoy 1 will slide relative to the bracket arms 12 when a buoy 1 is mounted on a bracket 7. The buoy 1 is free to slide, either onto or off of, the bracket arms 12, but the overlapping ribs 8 and elongated protrusions 9 will prevent a buoy 1 form being lifted off of the bracket 7 so that the buoy 1 will be secured to the bracket 7 where it will not become dislodged and cause problems on the boat, especially in heavy seas. Sufficient force can, however, be applied by hand to snap the buoy 1 off the bracket 7, because the area around the buoy can be flexed to release the channel ribs from the bracket protrusions 9. When the bracket 7 is mounted on a bulkhead 17 with the arms 12 extending upward, a buoy 1 can be mounted on a bracket by sliding the buoy 1 down relative to the bracket 7 with the two parallel arms 12 received within two parallel channels 6 as shown in FIG. 6. A mounted buoy 1 can be removed from the bracket 7 by sliding the buoy 1 in the opposite direction. The buoy 1 can also be snapped into place on the bracket 7 by pressing the buoy into engagement.

One or more additional buoys 1 can be stacked on top of a buoy 1 mounted on a bracket 7 as shown in FIG. 7. The ridges 11 on a mounted or inner buoy 1, mounted on the bracket 7, will slide into aligned channel 6 on an upper buoy, which can be added to the stack. Each ridge 11 has a rib 18 protruding from an inwardly facing side in position so that rib 18 on ridge 11 and rib 8 in channel 6 will overlap when one buoy is stacked on top of another buoy. The height of rib 18 is approximately equal to 1 mm and is approximately the same height as rib 8. The overlap between these ribs can be overcome by hand so that two buoys 1 can be snapped together or pulled apart in addition to sliding the buoys 2 into engagement.

The central section or shaft 3 extending between the buoyant side sections 2 has a height, which is less than the height of the side sections 2. A line 15 can thus be attached to the shaft 3 and wrapped around it, with the side sections 2 serving as lateral barriers so the line 15 can be wrapped smoothly in several layers to provide sufficient length. In the preferred embodiment of this invention, the length of the line 15 can be approximately seventy five (75) feet, and there is enough room to wrap an 18 gauge Nylon line around central shaft section 3. A U-shaped metal weight 14 of the type shown in U.S. Design Pat. D456,336, incorporated herein by reference, can be inserted over the line 15 wrapped around the central shaft section 3, and, as best seen in FIGS. 1 and 4, the weight 14 will not protrude beyond the top and bottom surfaces of side sections 3. The weight 14 and line 15 will not therefore interfere with the ability to mount the buoys 1 on bracket 7 or to stack multiple buoys 1, one on top of another. Preferably the generally U-shaped weight 14 will comprise a rigid member with some resiliency, so that the weight 14 will retain the line 15, as well as itself, on the central shaft section 3 for storage. When the weight 14 is in the fully inserted position shown in FIGS. 2-4 and 6 and 7, the weight 14 will press down between opposite edges of central shaft section 3, serving to more securely hold the weight 14 in position. The weight will have a beveled configuration with its narrowest point between the ends of the weight and the bight of the U-shaped weight 14. Thus the weight will be securely held on central shaft 3, and it will require virtually the same amount of force disengage the weight 14 from the central shaft section 3 as was required to originally insert the weight 14 into the fully mated configuration shown in FIGS. 2-4. Normally the weight will exert sufficient force on the hollow central shaft section 3 to cause minor resilient deformation of this oblong section requiring additional force to extract the weight over corners of the central section, which will be stiffer.

When in use, the weight 14 will be tied to the end of the line 15. To deploy the buoy 1, the weight is merely tossed into the water, and the buoy is itself launched onto the water. As the weight sinks, the floating buoy will rotate on the surface of the water until sufficient line has played out for the weight to anchor itself. To retrieve the buoy 1, the line 15 is simply rewound around the central shaft section 3 and the weight 14 is inserted over the line 14. The retrieved buoy 1 can then slide into position on the bracket 7 in the manner shown in FIGS. 6 and 7, or it can be mounted on another buoy.

The U-shaped bracket 7 can be molded from a plastic material. The version of the bracket 7 shown in FIG. 10 has a continuous groove extending into one side, but the bracket can be fabricated without this groove as shown in FIG. 1. Bracket arms 12 have rounded ends 19 which facilitate entry of the arms 12 into buoy channels 6 when the buoy is mounted on the bracket 7. The length of the buoy channels 6 and the bracket arms 12 are chosen so that the rounded arm ends 19 will abut the stop surface in each channel 6 before the buoy engages the bracket base section 13 extending between parallel arms 12. The elongate protrusion 9 on the inner edge of each arm 12, as seen in FIG. 1, is also seen in the cross section of FIG. 11. As previously discussed the bracket 7 can be mounted on a bulkhead or panel 17 by using screws of fasteners extending through the holes 10 in each bracket arm 12 or by adhesively securing the bracket 7 to the bulkhead 17. Double-sided adhesives, which can be provided with the initial assembly, are well suited for mounting the bracket 17 on a boat bulkhead without penetrating the bulkhead. A buoy 1 can be packaged in mounting engagement with a bracket 7, with the weight 14 fitted over the line 15 on the central shaft section 3. The entire assembly can be packaged in a blister package for sale, and mounting screws and double-sided adhesive strips can be included. The line 15 need not be attached to the weight in the original package.

Conventional light sticks 5 can also be packaged with the buoy and bracket assembly, but the means of mounting light sticks 5 onto the buoy 1 is chosen so that a user can purchase standard, commercially available light sticks 5 for use with the buoy. The mounting means comprises a hole 16 extending through a centrally located web 18, which is integrally formed with the buoy 1. Web 18 and hole 16 are positioned within pockets 4 extending inwardly from opposite faces along the outer edge of each buoyant side section 2 of the blow molded buoy 1. This provides adequate space for insertion of a light stick 5 into a hole 16 located within each pocket 4. The light sticks 5 will be inserted after the buoy 1 is deployed, but the holes 16 are dimensioned so that a tight fit will be formed with each standard light stick 5. This means that the light sticks 5 can be inserted into the holes 16 before the buoy 1 is deployed. As the weight sinks and the buoy 1 rotates, the chemical light sticks 5, which do not require a flame, and rotate into and out of the water. In the preferred embodiment, the diameter of the holes 16 is approximately 0.3 inch.

It will of course be understood by one of ordinary skill in the art that this invention is not limited to the representative embodiment depicted herein. For instance the channels could be located along the sides of the outermost side of the buoyant side sections so that the buoy could slip between arms on a bracket. An L shaped member could also extend from the same side of each side section so that multiple buoys could still be stacked. L-shaped arms could also protrude in opposite directions from opposite faces of the side portions so that the L-shaped arms could overlap for stacking. These alternatives are presented not to suggest that they would be superior to the representative embodiment shown herein, but merely to show that other configurations employing the substance of this invention are possible, and that the invention is defined by the following claims and is not limited to this embodiment.

I claim:

1. A buoy comprising:
    a buoyant housing including a first section with a line wrapped therearound for storage, and at least one side section having a height greater than the first section;
    an elongate mounting section on one surface of the buoyant housing, the one surface extending beyond the line wrapped on the first section so that the elongate mounting section is exposed, the mounting section comprising means for snapping the buoy to a separate bracket member for mounting the buoy on the bracket when the buoy is not in use, wherein
    each elongate mounting section comprises a channel extending inwardly of the surface from which the channel extends, and
    an elongate ridge extends from a surface of the side section opposite from the surface from which the channel extends, each elongate ridge extending parallel to the channel on the side section and being dimensioned so that a ridge can be inserted into a channel on a second identical buoy when first and second buoys are stacked.

2. The buoy of claim 1 wherein the first section comprises a central section extending between two side sections, each side section including an elongate mounting section extending parallel to an elongate mounting section on the other side section.

3. The buoy of claim 1 wherein the central section and the two side sections comprise sections of a one-piece blow molded housing.

4. The buoy of claim 3 wherein each channel includes a rib extending from one side surface of the channel.

5. The buoy of claim 4 wherein each ridge also includes a rib extending form one side surface of the ridge, channel ribs and ridge ribs being positioned so that ribs on stacked buoys will overlap to secure two stacked buoys together.

6. The buoy of claim 2 wherein a pocket is located on one side buoy section, the pocket including a hole dimensioned for receipt of a light stick mountable on the buoy.

7. The buoy of claim 2 including a weight attached to one end of the line is insertable over the line on the central buoy section.

8. The buoy of claim 2 wherein the two side sections are identical and are symmetrically disposed relative to the central section.

9. A buoy comprising:
a weight attached to a line;
a housing having a buoyant section and a smaller shaft section, extending from a first side of the buoyant section, about which a line is wrapped, the weight being secured to the shaft section;
an exposed pocket adjacent a second side of the buoyant section;
a mounting means in the pocket for mounting a cylindrical light stick on the buoy before or after the weight and line have been deployed to position the buoy in water, wherein the mounting means comprises a hole in a flat section located between opposite surfaces forming the exposed pocket so that the cylindrical light stick can be mounted in the exposed pocket so that the cylindrical light stick will be visible.

10. The buoy of claim 9 wherein the housing comprises a one-piece housing.

11. The buoy of claim 10 wherein the housing comprises a blow molded housing.

12. The buoy of claim 11 wherein the housing includes two buoyant sections on opposite ends of the smaller shaft section.

13. A buoy bracket assembly for use on a boat comprising:
a bracket mountable on a bulkhead on the boat, the bracket including at least one arm;
a buoy mountable on the bracket, the buoy comprising a buoyant housing having a channel extending along one face of the buoyant housing, the channel being configured for insertion of the bracket arm into the channel to mount the buoy on the bracket for storage of the buoy when not in use, the buoy being slidable relative to the bracket arm for removal of the buoy from the bracket and disengagable by snapping the buoy off of the bracket.

14. The buoy bracket assembly of claim 13 wherein the buoyant housing includes two parallel channels, and the bracket includes two parallel arms, the two arms being simultaneously insertable into aligned channels to mount the buoy on the bracket.

15. The buoy bracket assembly of claim 14 wherein the buoy housing includes two ridges, extending parallel to the two channels, from surfaces of the buoy opposite from surfaces into which the channels extend, the ridges having substantially the same width as the bracket arms to comprise means for stacking additional buoys, one above the other.

16. The buoy bracket assembly of claim 15 wherein the buoy comprises a blow molded housing forming a one piece member.

17. The buoy bracket assembly of claim 14 including a shaft recessed from sections of the buoy on which the channels and ridges are located, the buoy further comprising a line wrapped around the shaft with a weight attached to the line, the line and buoy remaining recessed so that multiple buoys can be stacked one on top of another.

* * * * *